United States Patent [19]

Le-Khac

[11] Patent Number: 5,239,007
[45] Date of Patent: Aug. 24, 1993

[54] OIL-ABSORBENT COMPOSITIONS

[75] Inventor: Bi Le-Khac, West Chester, Pa.

[73] Assignee: ARCO Chemical Technology, L.P., Wilmington, Del.

[21] Appl. No.: 780,187

[22] Filed: Oct. 22, 1991

[51] Int. Cl.$^5$ .................. C08L 25/02; C08F 265/04; C08F 267/06

[52] U.S. Cl. .................. 525/241; 525/244; 525/262; 525/304; 525/305; 525/346; 525/347

[58] Field of Search ............... 525/241, 244, 262, 304, 525/305; 526/346, 347

[56] References Cited

U.S. PATENT DOCUMENTS

| | | | |
|---|---|---|---|
| 3,520,806 | 7/1970 | Haigh | 210/410 |
| 3,999,653 | 12/1976 | Haigh et al. | 206/584 |
| 4,172,031 | 10/1979 | Hall et al. | 210/36 |
| 4,835,222 | 5/1989 | Sypniewski | 525/244 |
| 4,895,909 | 1/1990 | Sypniewski | 525/309 |
| 4,990,539 | 2/1991 | Hahn et al. | 521/56 |
| 5,096,931 | 3/1992 | Wittenberg et al. | 521/59 |

FOREIGN PATENT DOCUMENTS 397001A 11/1990 European Pat. Off. .

*Primary Examiner*—John Kight, III
*Assistant Examiner*—John M. Cooney, Jr.
*Attorney, Agent, or Firm*—Jonathan L. Schuchardt

[57] ABSTRACT

Oil-absorbent compositions are disclosed. The compositions are crosslinked interpolymers of an alkylated styrene and a rubber. The compositions of the invention have high absorption capacities and absorption rates compared with prior-art compositions.

15 Claims, No Drawings

OIL-ABSORBENT COMPOSITIONS

FIELD OF THE INVENTION

The invention relates to oil-absorbent compositions. Specifically, the compositions of the invention are crosslinked interpolymers of alkylated styrenes and rubbers.

BACKGROUND OF THE INVENTION

Crosslinked alkylated styrene polymers are well known organic liquid absorbents. U.S. Pat. No. 3,520,806 teaches that polymers of tert-butylstyrene or copolymers of tert-butylstyrene and methyl methacrylate crosslinked with divinylbenzene are effective absorbents for organic liquids such as benzene, hexane, kerosene, and toluene. Crosslinking is needed to prevent the polymers from dissolving in the organic liquid. The polymers are prepared by emulsion, suspension, or bulk polymerization.

Unfortunately, the absorption capacity of these polymers is limited, and absorption rates possible are still somewhat less satisfactory than would be desirable. Previous efforts to optimize these properties have focused on varying the crosslink density or the type of monomers employed. Incorporation of other monomers has yielded only limited improvement in absorption capacity or rate. Controlling absorptivity via crosslink density is difficult because there is a narrow processing window: Too little crosslinking agent gives oil-soluble polymers, while too much crosslinker reduces the polymer's ability to absorb organic liquids.

Interpolymers of polyolefins and styrenic monomers are disclosed in European Patent Application No. 397,001. These polymers are useful for producing expanded plastic articles having good elasticity. A crosslinking agent is used in an amount within the range of about 0.005 to 0.05 mole percent based on the amount of styrenic monomer. The low degree of crosslinking makes these polymer beads capable of impregnation and expansion to form low-density foamed articles. The polymers described in this reference would not be useful as oil absorbents because they are soluble in organic liquids.

An object of the invention is to provide improved oil-absorbent compositions. Oil-insoluble compositions with high capacities and fast absorption rates are desirable. Preferably, the compositions have effective oil-absorption properties over a wide range of processing conditions.

SUMMARY OF THE INVENTION

The invention is a composition useful as an organic liquid absorbent. The composition is an interpolymer formed by polymerizing an alkylated styrene in the presence of a rubber and an amount of a crosslinking agent effective to prevent the composition from dissolving in the absorbed liquid. Optionally, an ethylenically unsaturated monomer is copolymerized with the alkylated styrene, rubber, and crosslinking agent.

DETAILED DESCRIPTION OF THE INVENTION

An alkylated styrene and a crosslinking agent are copolymerized in the presence of a rubber to produce the compositions of the invention.

The alkylated styrene may have from 1 to 3 alkyl substituents on the ring in addition to the vinyl group. The alkyl groups may have from 1 to 20 carbon atoms, preferably from 4 to 12 carbon atoms. Tertiary alkyl styrenes, such as tert-butylstyrene and tert-amylstyrene, are preferred. n-Alkyl styrenes, sec-alkyl styrenes, and iso-alkyl styrenes are also suitable.

Examples of suitable alkylated styrenes include, but are not limited to, tert-butylstyrene, tert-amylstyrene, 2,4-di-tert-butylstyrene, p-tert-hexylstyrene, p-tert-dodecylstyrene, n-butylstyrene, 2,4,6-trimethylstyrene, n-octylstyrene, n-amylstyrene, n-ethylstyrene, sec-butylstyrene, sec-octylstyrene, isobutylstyrene, isoamylstyrene, isooctadecylstyrene, and the like, and mixtures thereof.

A crosslinking agent is copolymerized with the alkylated styrene. The amount of crosslinking agent used is important. If too little crosslinking agent is used, the copolymer will dissolve in the organic liquid. If too much is used, absorbency of the polymer is reduced. Thus, the necessary amount of crosslinking agent is the amount needed to prevent the polymer from dissolving in the absorbed organic liquid.

The actual amount of crosslinking agent needed will depend on many factors, including the identity and proportions of monomers involved, the intended use of the polymer, and the identity of the crosslinker. Generally, the amount used is greater than about 0.15 mole percent based on the amount of polymerizable monomers. A preferred amount is the range from about 0.15 to about 0.50 mole percent.

Crosslinking agents useful for the compositions of the invention have two or more double bonds, are at least partially soluble in the alkylated styrene monomer, and will copolymerize with styrenic monomers. Suitable polyethylenically unsaturated compounds useful as crosslinkers include, but are not limited to, divinylbenzene, diethylene glycol dimethacrylate, hexamethylene-1,6-dimethacrylate, diisopropenylbenzene, diisopropenylbiphenyl, diallylphthalate, allyl methacrylates, allyl acrylates, vinyl isopropenylbenzene, and the like.

A rubber is included in the polymerization with the alkylated styrene and crosslinking agent to produce the interpolymers of the invention. The amount of rubber used is preferably within the range of about 1 to about 50 weight percent based on the total weight of the interpolymer. The molecular weight of the rubber is preferably at least about 1000, and may be $10^6$ or higher provided that the rubber is soluble in the monomer mixture.

The rubber may be a saturated rubber, such as, for example, polyisobutylene, ethylene-propylene rubber, vinyl ether rubbers, acrylate rubbers, and butyl rubbers. Unsaturated rubbers, such as, for example, EPDM rubbers, butadiene rubbers, isoprene rubbers, and styrene-butadiene rubbers, are also suitable. The main requirement of the rubber is that it be soluble in the monomer mixture. Polyisobutylene and butadiene rubbers are preferred.

Optionally, the alkylated styrene, crosslinking agent, and rubber are copolymerized in the presence of one or more ethylenically unsaturated monomers. Any ethylenically unsaturated monomer that will copolymerize with the alkylated styrene may be used. Suitable ethylenically unsaturated monomers include vinyl aromatic monomers, alpha-olefins, iso-olefins, acrylates, methacrylates, vinyl halides, maleate and fumarate esters and half esters, alkyl vinyl ketones, alkyl vinyl ethers, isoprene, dienes, and the like. Specific examples include, but are not limited to, styrene, propylene, isobutylene, methyl methacrylate, laurel methacrylate, tert-butyl acrylate, vinyl chloride, diethyl maleate, methyl vinyl ketone, ethyl vinyl ether, butadiene, and the like.

The amount of ethylenically unsaturated monomer used will typically be within the range of 0 to about 50 mole percent based on the amount of alkylated styrene used. The ethylenically unsaturated monomer may be included for any number of purposes, for example: to optimize cost, to help compatibilize the other components, to improve processing characteristics, to improve absorptivity of the resin for a particular organic liquid.

The compositions of the invention are effective for absorbing a wide variety of compounds and mixtures of compounds that may be generally categorized as organic liquids. Examples of organic liquids include, for example, crude oil, gasolines, kerosenes, mineral spirits, mineral oil, light and heavy oils, cooking oils, aromatic solvents such as benzene, toluene, and xylenes, terpenes, ketones, esters, phenols, aldehydes, amides, amines, fatty acids, esters of fatty acids, halogenated hydrocarbons, alkanes, cycloalkanes, and the like.

The interpolymers of the invention may be prepared by any suitable radical polymerization method known to those skilled in the art, including bulk, emulsion, suspension, bulk-suspension, and solution polymerization. The preferred method is suspension polymerization because handling, use, and disposal of the resulting particles or beads are convenient and cost effective.

In a typical aqueous suspension polymerization process, the alkylated styrene, crosslinking agent, rubber, and any optional comonomers, are combined with water, suspending agent, and a free-radical initiator, and heated until polymer beads form. The beads are isolated, washed, dried, and used as absorbents for organic liquids.

The following examples merely illustrate the invention. Those skilled in the art will recognize numerous variations that are within the spirit of the invention and scope of the claims.

EXAMPLES 1-3

General Procedure

Tert-butylstyrene (50 g) is combined with t-butyl perbenzoate (0.05 g), benzoyl peroxide (0.20 g), divinylbenzene (0.2-0.3 g), polyisobutylene liquid (Polysciences, Inc.) (2-5 g), deionized water (75 g), tricalcium phosphate (0.76 g), and sodium bisulfite (0.004 g) in a glass polymerization bottle. The mixtures are heated with agitation at 90° C. for 5 h, then at 135° C. for 1 h, to give polymer beads. The beads are washed with aqueous acid and air dried prior to testing for absorbency. (See Table 1).

Method for Measurement of Absorbent Capacity

A sample of oil-absorbent composition (1.0 g) is dispersed in the hydrocarbon liquid (50 g) in a closed container at room temperature overnight. The mixture is filtered through a 150 micron polypropylene screen. The composition is reweighed, and absorbent capacity is calculated as follows:

$$\text{absorbent capacity} = \frac{\text{weight of wet composition}}{\text{weight of dry composition}} - 1$$

Heavy oils such as crude oil are tested using a modified procedure: The oil-absorbent composition (1.0 g) is placed in a closed container. The oil is added slowly to the dry absorbent using an eye-dropper. As the oil is absorbed, the absorbent becomes thick and rubbery.

TABLE 1

Organic Liquid Absorbencies of Crosslinked Polymer Beads

| Example # | 1 | 2 | 3 | C4 | C5 | C6 | 7 | 9 | 9 | 10 |
|---|---|---|---|---|---|---|---|---|---|---|
| Monomers (g) | | | | | | | | | | |
| t-butylstyrene | 50 | 50 | 50 | 50 | 50 | 50 | 50 | 41.5 | 50 | 60 |
| t-butylacrylate | 0 | 0 | 0 | 0 | 0 | 0 | 0 | 8.5 | 10 | 0 |
| Rubber (g) | | | | | | | | | | |
| Polyisobutylene | 2.0 | 5.0 | 2.0 | 0 | 2.0 | 2.5 | 5.0 | 8.4 | 10 | 0 |
| Butadiene rubber | 0 | 0 | 0 | 0 | 0 | 0 | 0 | 0 | 0 | 10 |
| Crosslinker (g) | | | | | | | | | | |
| Divinylbenzene (78%)* | 0.15 | 0.15 | 0.10 | 0.15 | 0.03 | 0.05 | 0 | 0.085 | 0.10 | 0.09 |
| 1,6-HMDM | 0 | 0 | 0 | 0 | 0 | 0 | 0.15 | 0 | 0 | 0 |
| Mole % Crosslinker | 0.30 | 0.30 | 0.20 | 0.30 | 0.06 | 0.10 | 0.20 | 0.20 | 0.15 | 0.18 |
| Absorbency (g/g) | | | | | | | | | | |
| Toluene | 20.8 | 20.0 | 19.0 | 15.8 | sol | sol | 18.0 | 20.0 | 20.0 | — |
| Kerosene | 14.5 | 16.7 | 16.0 | 11.0 | sol | sol | 15.5 | 15.2 | 15.2 | — |
| Crude Oil | 16.8 | — | — | 7.0 | sol | sol | — | 12.0 | 12.0 | 10.6 |
| Cyclohexane | 14.7 | 19.3 | 16.8 | 13.0 | sol | sol | 13.7 | 16.8 | 16.8 | — |
| Hexane | 9.5 | 13.0 | 10.5 | 8.0 | sol | sol | 10.7 | 11.0 | 11.0 | — |
| Styrene | 16.0 | 15.3 | 18.0 | 13.9 | sol | sol | 16.3 | 20.0 | 20.0 | — |
| Gasoline | 12.7 | — | — | — | — | — | — | 21.0 | 15.3 | — |
| Tetrahydrofuran | 16.7 | — | — | — | — | — | — | 15.3 | 21.0 | — |
| Time Required/Full Capacity Absorpt. (h) | — | — | — | 20 | — | — | — | — | — | 0.5 |

1,6-HMDM = 1,6-hexamethylene dimethacrylate
sol: polymer dissolved in the organic liquid
—: polymer not tested with this organic liquid
*Crude mixture of components containing 78% by weight of divinylbenzene Full absorption capacity is reached when the thick mixture becomes loose and can flow when the container is tilted.

COMPARATIVE EXAMPLE 4

Preparation of t-Butylstyrene/Divinylbenzene Copolymer

The procedure of Examples 1-3 is followed using 0.15 g of divinylbenzene, but polyisobutylene is omitted from the formulation. The resulting polymer beads are tested for oil absorbency. (See Table 1).

COMPARATIVE EXAMPLES 5-6 t-Butylstyrene/polyisobutylene interpolymers Effect of Low Crosslinker Content The procedure of Examples 1-3 is used to prepare polymer beads from 2-2.5 g of polyisobutylene (4-5 wt.%), but only 0.03-0.05 g (0.06-0.1 mole %) of divinylbenzene is used. These lightly crosslinked beads are completely soluble in the organic liquids tested (see Table 1).

EXAMPLE 7

The procedure of Examples 1-3 is used with 5 g of polyisobutylene (9.1 wt. %), except that 1,6-hexamethylene dimethacrylate (0.15 g, 0.2 mole %) is used in place of divinylbenzene. Oil absorbency results are shown in Table 1.

EXAMPLE 8

The procedure of Examples 1-3 is followed using a monomer mixture of tert-butylstyrene (41.5 g) and tert-butylacrylate (8.5 g). Divinylbenzene (0.085 g, 0.20 mole %) is the crosslinking agent, and 8.4 g of polyisobutylene (14.4 wt. %) is used. Oil absorbency results are summarized in Table 1.

EXAMPLE 9

The procedure of Examples 1-3 is followed using a monomer mixture of tert-butylstyrene (50 g) and tert-butylacrylate (10 g). Divinylbenzene (0.10 g, 0.15 mole %) is the crosslinking agent, and 10 g of polyisobutylene is used. Oil absorbency results appear in Table 1.

EXAMPLE 10

The procedure of Examples 1-3 is followed with tert-butylstyrene (60 g), divinylbenzene (0.09 g), and "Diene 35" butadiene rubber (Firestone, 10 g) in place of polyisobutylene. The dried beads have an absorbency for Alaskan crude oil of 10.6 g/g compared with 7.0 g/g for the tert-butylstyrene polymer unmodified with a rubber (Comparative Example 4). In addition, the butadiene rubber-modified polymer requires only 30 minutes to reach full capacity, compared with 20 hours for the control.

As shown in Table 1, high enough levels of divinylbenzene give polymer beads that will absorb organic liquids well, but will not dissolve in them. Comparative Examples 5 and 6 show that too little crosslinking agent results in polymer beads that are soluble in the organic liquids. Comparative Example 4 shows the absorbency of a crosslinked polymer of tert-butylstyrene without a rubber present.

Examples 1-3, and 7-10 show the superior organic liquid absorbency of the crosslinked alkylated styrene/rubber interpolymers of the invention compared with the crosslinked alkylated styrene polymers of the prior art (Comparative Example 4).

Example 10 also illustrates the much faster absorption rate of a butadiene rubber-modified polymer of the invention compared with prior-art compositions. The rubber-modified polymer surprisingly requires only 30 minutes for full absorption capacity versus 20 hours for the control (Comparative Example 4).

I claim:

1. A composition useful as an organic-liquid absorbent, said composition comprising an interpolymer formed by polymerizing an alkylated styrene in the presence of from about 4 to about 50 weight percent based on the total weight of the composition of a rubber, and an amount of a crosslinking agent within the range of about 0.15 to about 0.50 mole percent based on the amount of polymerizable monomers used.

2. The composition of claim 1 wherein the alkylated styrene includes from one to three $C_1$-$C_{20}$ linear or branched alkyl groups.

3. The composition of claim 1 wherein the rubber is selected from the group consisting of ethylene-propylene rubbers, vinyl ether polymers, acrylate polymers, butene polymers, ethylene-propylene-diene rubbers, butadiene rubbers, isoprene rubbers, and styrene-butadiene rubbers.

4. The composition of claim 1 wherein the crosslinking agent is selected from the group consisting of diacrylates, dimethacrylates, and divinyl aromatic compounds.

5. The composition of claim 1 wherein the interpolymer is formed by copolymerizing the alkylated styrene with an ethylenically unsaturated monomer in the presence of the rubber and the crosslinking agent.

6. The composition of claim 1 wherein the polymerization is performed in an aqueous suspension.

7. A composition useful as an organic liquid absorbent, said composition comprising an interpolymer formed by polymerizing tert-butylstyrene in the presence of from about 4 to about 50 weight percent based on the total weight of the composition of a rubber, and an amount of a crosslinking agent within the range of about 0.15 to about 0.50 mole percent based on the amount of polymerizable monomers used.

8. The composition of claim 7 wherein the polymerization is performed in an aqueous suspension.

9. The composition of claim 7 wherein the interpolymer is formed by copolymerizing tert-butylstyrene and an ethylenically unsaturated monomer in the presence of the rubber and the crosslinking agent.

10. A composition useful as an organic liquid absorbent, said composition comprising an interpolymer formed by polymerizing an alkylated styrene in the presence of from about 4 to about 50 weight percent based on the total weight of the composition of a rubber selected from the group consisting of polyisobutylene and butadiene rubbers, and an amount of a crosslinking agent within the range of about 0.15 to about 0.50 mole percent based on the amount of polymerizable monomers used.

11. The composition of claim 10 wherein the alkylated styrene includes from one to three $C_1$-$C_{20}$ linear or branched alkyl groups.

12. The composition of claim 10 wherein the crosslinking agent is selected from the group consisting of diacrylates, dimethacrylates, and divinyl aromatic compounds.

13. The composition of claim 10 wherein the polymerization is performed in an aqueous suspension.

14. The composition of claim 10 wherein the interpolymer is formed by copolymerizing the alkylated styrene with an ethylenically unsaturated monomer in the presence of the rubber and the crosslinking agent.

15. A method of absorbing an organic liquid, said method comprising contacting the liquid with an absorbent having the composition of claim 1.

* * * * *